United States Patent Office 3,484,191
Patented Dec. 16, 1969

3,484,191
TREATMENT OF HYGROSCOPIC MAGNESIUM CHLORIDE SALTS FOR REMOVING OXYGEN CONTAINING CONTAMINANTS
Leland R. Lyons, Boulder City, Nev., assignor to National Lead Company, New York, N.Y., a corporation of New Jersey
No Drawing. Filed Feb. 29, 1968, Ser. No. 709,232
Int. Cl. C01b 5/26
U.S. Cl. 23—91                                                8 Claims

ABSTRACT OF THE DISCLOSURE

Process for purifying magnesium chloride salt with respect to oxygen containing contaminants comprising fusing said salt to a molten state and treating with sulfur chloride preferably in amount of 4–10 times by weight of said contaminants. If the salt contains sulphate contaminants, it is also preferably subjected in the fused state to an after treatment with activated carbon in amount of about ⅛ of 1% by weight of said fused salt for eliminating residual amounts of such contaminants.

---

This invention pertains generally to the purification of hygroscopic, metal chloride salts with respect to oxygen containing compounds or other oxygen containing contaminants therein, and provides novel methods and means for eliminating the same.

The invention pertains more specifically to the elimination of such contaminants from magnesium chloride salts obtained or derived from naturally occurring sources, and for obtaining substantially anhydrous magnesium chloride therefrom.

Although magnesium chloride and/or sulfate salts from which latter the chloride is easily obtained by desulfation, are abundantly distributed throughout the world in aqueous salt solutions along with other salts, such as the chloride and/or sulfate salts of sodium, potassium, lithium, calcium, etc., as found for example, in ocean waters, inland seas, salt lakes and wells, and also in crystalline state in salt beds formed in the past by solar evaporation of inland seas, lakes and the like, the isolation and recovery of substantially pure and anhydrous magnesium chloride from such sources presents problems of considerable intricacy for solution. While the magnesium salts are quite soluble as compared to various of the other salts with which they are usually found associated in aqueous solutions or in the solid state, such as the salts sodium, potassium, calcium, etc., and thus may be isolated and recovered from aqueous solutions thereof in impure state by first selectively precipitating such other salts, to produce a mother liquor consisting largely of chloride and sulfate salts of magnesium, which may be desulfated as by treatment with calcium chloride and the mother liquor from which may thence be evaporated to substantial dryness, as by spray drying, the impure magnesium chloride salt thus obtained precipitates in hydrated form, and unless carefully desulfated, is ordinarily also contaminated to some minor extent with sulfate salts, so that the final product will contain, as explained more in detail below, various oxygen containing compounds, such as $H_2O$, and any one or more of $MgO$, $MgOH.Cl$, $Mg(OH)_2$ and sulfates.

The oxygen containing impurities retained in the impure salt as thus recovered are, however, highly deleterious in the production of metallic magnesium therefrom by electrolysis of molten salt baths containing the same. If the magnesium chloride employed for such purposes contains an appreciable amount of water of crystallization, the electrolysis results in evolution of HCl to the extent of the $H_2O$ present, by reaction with the chlorine gas released by the electrolysis with the hydrogen of the $H_2O$, the oxygen content of which in turn reacts with magnesium to form MgO and also with the carbon anodes of the electrolysis cell to form $CO_2$ gas. The carbon anodes are thus eroded and corroded. In addition the magnesium oxide forms a sludge in the cell which reduces its operating efficiency and also reduces the recovery of metallic magnesium. In similar fashion other oxide bearing contaminants present in the bath attack the carbon anodes, while sulfates in particular, present therein, also attack the refractory lining of the electrolysis cell. This results in shortened cell life, losses of operating electrolysis current, and contributes to surface tension problems which interfere with coalescence and proper recovery of the magnesium metal produced. It is, therefore, essential that magnesium chloride employed for the production of metallic magnesium by electrolysis be substantially free from oxygen bearing compounds or other oxygen containing impurities.

Completely anhydrous magnesium chloride substantially free from oxidic impurities may be obtained by chlorination of pure magnesium oxide at elevated temperature in the presence of carbon or carbon yielding compounds, such as carbon monoxide, carbon tetrachloride, etc., but the process is expensive and the sources of pure magnesium oxide are limited. On the other hand, the impure, hydrated form of $MgCl_2$ obtained from naturally occurring sources as above outlined, requires purification with respect to oxidic content including the water of crystallization. If an essentially magnesium chloride containing mother liquor derived as above from an aqueous salt solution, is slowly evaporated to dryness, the crystalline hydrate obtained is the hexahydrate, $MgCl_2.6H_2O$, containing six molecules of water crystallization. Four molecules of $H_2O$ may be eliminated by drying at elevated temperature on the order of 400° F. to produce the dihydrate, $MgCl_2.2H_2O$. But on further heating to eliminate the residual $H_2O$, decomposition and hydrolysis occurs with the result that anhydrous chloride and the basic magnesium hydroxychloride Mg.OH.Cl are produced. On spray-drying a highly concentrated aqueous solution or slurry of the dihydrate at about 900–1000° F., a fraction of the $MgCl_2$ is decomposed by the hot moisture-laden gases, into HCl and any one or more of MgO, $MgOH.Cl$ and $Mg(OH)_2$, all of which are dealt with herein on an equivalent MgO basis. The spray-dried product thus obtained consists of essentially magnesium chloride powders containing about 1–5% by weight of $H_2O$ and 1–5% of MgO or equivalent.

In accordance with the present invention the oxygen containing compounds thus produced in the spray-dried product, as well as such others as may be initially present therein, such as sulfates, may be eliminated and a fully anhydrous magnesium chloride obtained, by treating the impure chloride in a fused state with a sulphur chloride compound or compounds of the group $S_2Cl_2$, $SCl_2$ and $SCl_4$ comprising sulphur-monochloride, -dichloride and -tetrachloride, respectively. In such treatment the sulphur of the sulphur chloride compound employed, either combines with oxygen present in the fused magnesium chloride bath to produce $SO_2$ gas evolved from the bath as such or is evolved as sulphur vapor; while the chlorine gas thus freed from the sulphur chloride compound rechlorinates the MgO or equivalent values to form $MgCl_2$.

Without being bound to any particular theory as to the reactions resulting from the sulfur chloride treatment, some reactions are presented below as likely possibilities, assuming $SCl_4$ or $SCl_2$ is the sulfur chloride compound employed.

(1) $2MgO + SCl_4 \rightarrow 2MgCl_2 + SO_2$
(2) $Mg(OH)_2 + SCl_4 \rightarrow MgCl_2 + 2HCl + SO_2$
(3) $2Mg.(OH).(Cl) + SCl_4 \rightarrow 2MgCl_2 + 2HCl + SO_2$
(4) $2H_2O + SCl_4 \rightarrow SO_2 + 4HCl$
(5) $Mg(OH)_2 + 2SCl_2 \rightarrow MgCl_2 + SO_2 + 2HCl + S$ With reference to the above equations it has been observed experimentally that depending on the sulfur chloride compound employed, sulfur is in some instances evolved as such from the molten salt bath, as in Equation 5 above. Also it has been observed that as the sulfur chloride is progressively added to the bath containing sulfates as an impurity, the $SO_4$ content increases up to a certain point and then decreases with continued addition of the sulfur chloride, as exemplified below. Alternatively and in accordance with a further refinement of the invention the sulfate thus produced by the sulfur chloride treatment, may be eliminated by subjecting the molten salt bath to an after treatment with activated carbon as is also exemplified below.

In carrying out the process of the invention the spray-dried magnesium chloride, containing magnesium oxide or equivalent, water of crystallization, sulfates and possibly other oxidic impurities, is charged into an enclosed melting furnace provided with a vent pipe and heated to a molten state by passage of alternating current between spaced carbon electrodes extending into the charges. When the charge is thus rendered molten, sulfur chloride is bubbled therethrough until the oxidic impurities have been substantially eliminated. The following examples will serve to illustrate the process.

EXAMPLE I

Sixty pounds of a spray-dried magnesium chloride obtained from the Great Salt Lake, in Utah, in the manner above described, was found on analysis to contain 1.4% by weight of magnesium oxide on an equivalent basis, and 0.07% by weight of $SO_4$. It was rendered molten by heating to about 1400° F., i.e. slightly above its melting point of 1310° F. The melt was treated with 2000 milliliters of $SCl_2$, amounting to 12.5% by weight of the magnesium chloride. The $SCl_2$ was bubbled through the molten charge. Upon completion of the $SCl_2$ treatment the molten salt bath was treated with 1/8th of 1% by weight of activated carbon sold under the trade name "Darco S-51". The following tabulation shows the results of the treatment:

|  | Percent by weight of— | |
|---|---|---|
|  | MgO | $SO_4$ |
| $MgCl_2$ as melted | 1.40 | 0.07 |
| After 6% $SCl_2$ treatment | 1.00 | 0.23 |
| After 12½% $SCl_2$ treatment | 0.42 | 0.35 |
| After ⅛th of 1% Darco D-51 treatment | 0.55 | <0.01 |

It will be noted from this experiment that the sulfur chloride addition was accompanied by a progressive increase in sulfate content, which was substantially eliminated by the after treatment with activated carbon.

It will further be seen from the above test results, that treatment of the fused salt with 12½% by weight of $SCl_3$ reduced to MgO content to 30% of its initial value, while the activated carbon after treatment reduced the $SO_4$ content to less than 1/7 of its initial value. The above treatment corresponds to a 9:1 weight ratio of the $SCl_2$ to the initial MgO content.

EXAMPLE II

Another specimen of spray-dried $MgCl_2$ from the same source as Example I, analyzed 1.2% MgO and 0.016% $SO_4$. The specimen was rendered molten and treated with $SCl_2$ and after treated with activated carbon sold also as "Darco G-60" with results as follows:

|  | Percent by weight of— | |
|---|---|---|
|  | MgO | $SO_4$ |
| $MgCl_2$ as melted | 1.2 | 0.016 |
| After 4 gms. $SCl_2$/100 gm. $MgCl_2$ | 0.5 | 0.019 |
| After 5 gms. $SCl_2$/100 gm. $MgCl_2$ | 0.4 | 0.017 |
| After 0.5 gm. carbon/100 gm. $MgCl_2$ | 0.4 | 0.003 |

This treatment corresponds to a 4:1 weight ratio of the $SCl_2$ to the initial MgO content. It will be noted that in this experiment the sulfur chloride addition did not appreciably increase, the initial sulfate content.

EXAMPLE III

Another specimen of $MgCl_2$ from the same source containing 1.4% MgO and 0.006% $SO_4$ was similarly treated with the following results:

|  | Percent by weight of— | |
|---|---|---|
|  | MgO | $SO_4$ |
| $MgCl_2$ as melted | 1.4 | 0.006 |
| After 6½ gm. $SCl_2$/100 gm. $MgCl_2$ | 0.4 | 0.240 |
| After 13½ gm. $SCl_2$/100 gm. $MgCl_2$ | 0.15 | 0.010 |

It will be noted that although the sulfate content increased initially with the sulfur chloride addition, with further addition thereof the sulfate content was reduced to a negligible value. Hence in this test no final activated carbon treatment was employed. The final treatment corresponded to a ratio by weight of $SCl_2$ to the initial MgO content of about 10:1 and the $SCl_2$ was added over a period of one hour.

What is claimed is:
1. The method of purifying a salt consisting of magnesium chloride and oxygen-containing contaminants present therein, which comprises fusing said salt to a molten state and bubbling therethrough a gas consisting of a sulfur chloride until said contaminants are substantially eliminated by being directly evolved from the bath as $SO_2$ gas alone or admixed with sulfur vapor, thereby resulting in a completely anhydrous magnesium chloride substantially free of said oxidic contaminants.

2. The method according to claim 1 wherein a stream of sulfur chloride is bubbled through said molten salt bath until said oxygen containing impurities are substantially eliminated.

3. The method according to claim 1 wherein said molten salt bath contains sulfate and is given an after-treatment with activated carbon for reducing the amount of sulfate therein.

4. The method according to claim 1 wherein said molten magnesium chloride salt is treated with sulfur chloride in amount of about 4 to 10 times by weight of the oxygen bearing contaminants present therein.

5. The method of producing a purified anhydrous magnesium chloride salt from hygroscopic magnesium chloride salt having oxygen-containing contaminants present therein, which comprises: spray drying said salt in aqueous medium at temperature to produce a spray-dried powder containing a fractional amount of an oxygen-containing compound of said salt, fusing said powder into a molten bath in a non-oxidizing atmosphere, and bubbling therethrough a gas consisting of a sulfur chloride until said oxygen-containing compound is converted to magnesium chloride and the other oxygen-containing contaminants are substantially eliminated by being directly evolved from the bath as $SO_2$ gas alone or admixed with sulfur vapor.

6. The method according to claim 5 wherein said magnesium chloride is spray dried in aqueous medium at about 900–1000° F. to produce a spray dried powder containing about 1–5% each of $H_2O$ and oxygen containing magnesium compounds.

7. The method according to claim 5 wherein said molten salt bath is treated with about 4 to 10 times by weight of the oxygen bearing contaminants therein.

8. The method according to claim 5 wherein said molten salt bath contains sulfate and is given an after treatment with activated carbon for reducing the amount of sulfate therein.

References Cited

UNITED STATES PATENTS

| | | | |
|---|---|---|---|
| 1,489,525 | 4/1924 | Goldschmidt | 23—91 |
| 1,933,499 | 10/1933 | Moschel | 23—91 |
| 2,970,887 | 2/1961 | Hill | 23—87 |
| 3,067,006 | 12/1962 | Ebert et al. | 23—91 |
| 3,275,409 | 9/1966 | Schubert et al. | 23—91 XR |
| 3,317,414 | 5/1967 | Fougner | 23—91 XR |
| 3,338,668 | 8/1967 | Lyons | 23—91 |

FOREIGN PATENTS 569,186  5/1945  Great Britain.

EDWARD STERN, Primary Examiner

U.S. Cl. X.R.

23—87